No. 856,088. PATENTED JUNE 4, 1907.
A. T. NEWMAN.
WATER AND GAS SEPARATOR.
APPLICATION FILED AUG. 28, 1906.

2 SHEETS—SHEET 1.

WITNESSES
M. Blondel
Asa P. Bright

INVENTOR
A. T. Newman
By O'Meara & Brock
ATTYS.

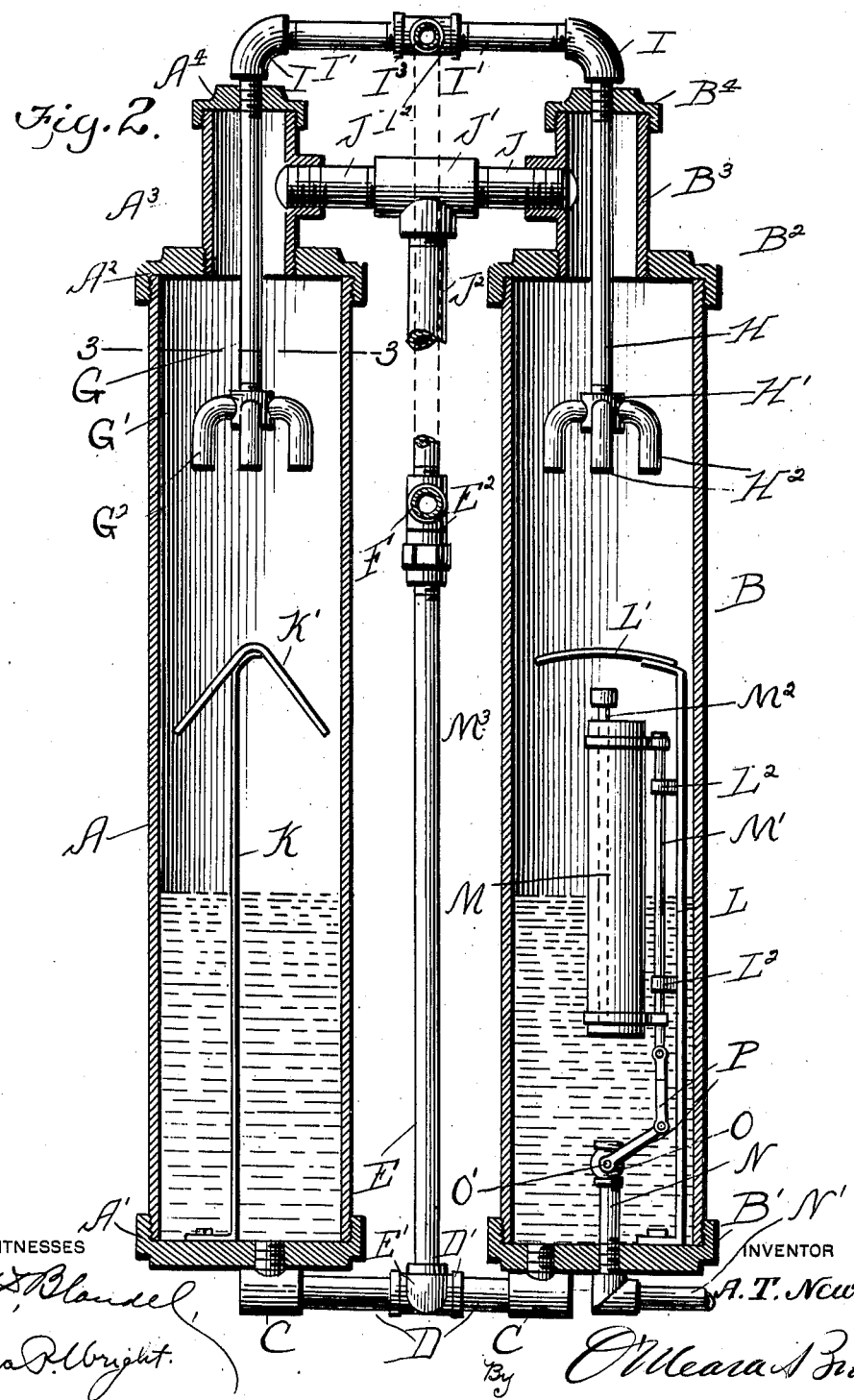

UNITED STATES PATENT OFFICE.

ALBERT T. NEWMAN, OF GREELEY, KANSAS, ASSIGNOR OF ONE-HALF TO ERNEST McCLURE, OF GREELEY, KANSAS.

WATER AND GAS SEPARATOR.

No. 856,088.　　　Specification of Letters Patent.　　　Patented June 4, 1907.

Application filed August 28, 1906. Serial No. 332,366.

*To all whom it may concern:*

Be it known that I, ALBERT T. NEWMAN, a citizen of the United States, residing at Greeley, in the county of Anderson, in the State of Kansas, have invented a new and useful Improvement in Water and Gas Separators, of which the following is a specification.

This invention relates to certain new and useful improvements upon my patent issued December 6, 1904, No. 776,753, the object being to distribute the force of gas, especially in high pressure so as to eliminate the spray and give the water chance to collect and settle to the bottom of the tank, and allow the separation to be made more perfectly.

With this and various other objects in view, the invention consists in the novel features of construction, hereinafter fully described and pointed out in the claims.

Figure 1:
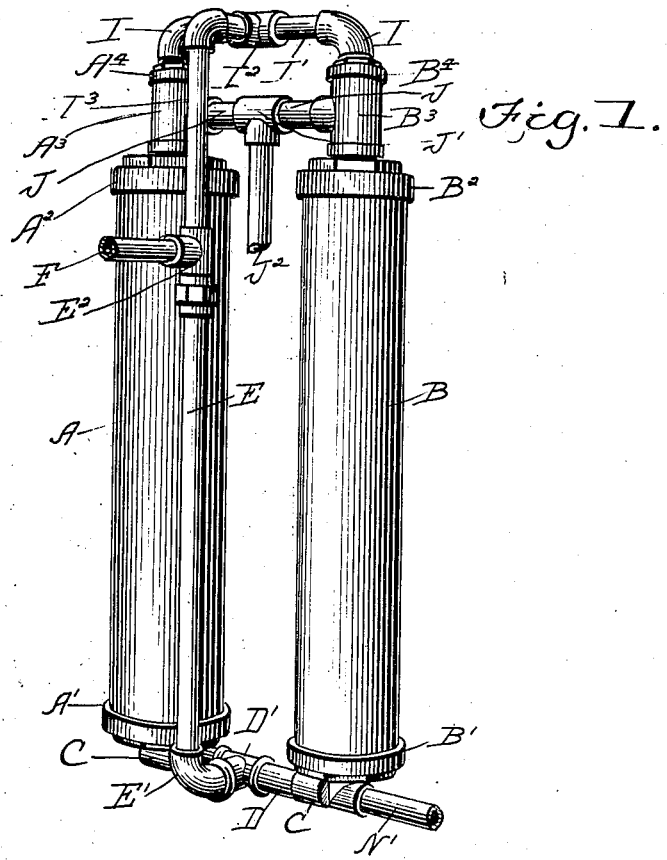
Figure 3:
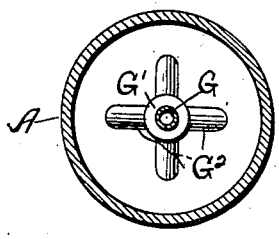
Figure 4:
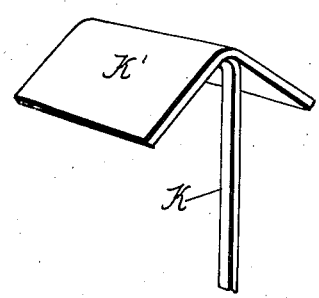
Figure 5:
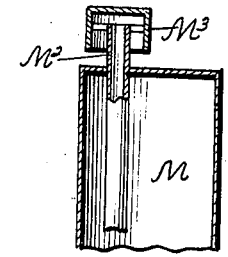

In the drawings forming a part of this specification:—Figure 1 is a perspective view of my improved water and gas separator. Fig. 2 is an enlarged vertical sectional view of the separator. Fig. 3 is a transverse sectional view taken on the lines 3—3 of Fig. 2. Fig. 4 is a perspective view of one of the hoods. Fig. 5 is a detail sectional view of the float.

Referring to the drawings A and B indicate a pair of tanks provided with threaded ends on which are secured caps $A'$, $A^2$, and $B'$, $B^2$. The caps $A'$, $B'$ are provided with threaded openings in which the threaded stem of the T-joints C are secured which are secured on the end of the pipe sections D provided with a T-coupling $D'$, extending out horizontally and to which an elbow $E'$, is secured carrying a pipe E provided with a T-coupling $E^2$, to which an inlet pipe F is connected. The caps $A^2$, $B^2$ are provided with threaded openings in which the lower threaded ends of the pipe sections $A^3$, $B^3$ are secured which are provided with caps $A^4$, $B^4$, on the upper ends provided with threaded openings through which the threaded ends of the pipes G and H project, which extend down into the tanks and are provided with heads $G'$, $H'$ carrying downwardly projecting curved distributing pipes $G^2$, $H^2$. Secured to the upper threaded ends of the pipes G and H, are elbows I provided with pipe sections $I'$, carrying a T-coupling $I^2$, provided with a pipe $I^3$, connected at its other end to the T-coupling $E^2$.

The pipe sections $A^3$, $B^3$, are provided with threaded openings in its side in which are secured pipe sections J, carrying a T-coupling $J'$, in which an outlet pipe $J^2$, is secured. Brackets K and L are secured in the tanks A and B, provided with hoods $K'$, $L'$ at their upper ends forming reflectors, the hood K being formed inverted V-shaped in cross-section. Secured to the bracket L are apertured lugs $L^2$, in which is mounted a rod $M'$, carrying a hollow float M, which is provided with a tube $M^2$, extending out from the top provided with a cap $M^3$, at its upper end which prevents the same from being filled with water and at the same time to allow the gas to enter the float, thereby equalizing the pressure. Projecting up through a threaded opening in the cap $B'$, of the tank B is a pipe N provided with a valve O, at its upper end, the stem $O'$ of which is connected to the bar $M'$ by links P. The other end of the pipe N is connected to a discharge pipe $N'$.

The operation of the device is as follows:—
The gas is led from the well by the pipe F, into the top and bottom of the tanks A and B through the pipes $I^3$, and E thereby dividing the force of the gas into the tank keeping the agitation in the bottom of the tanks preventing the dirt from settling and blocking up the pipes, and the gas entering the top of the tanks through the pipes G and H, is divided again by the distributers $G^2$, $H^2$, and strikes the hoods $K'$, $L'$ preventing the gas from boiling up the water accumulated in the bottom of the tank thus preventing much spray and protects the float M from incoming rush of gas, and as the gas rises, it will pass out the outlet pipe $J^2$. As the water rises in the tank, it will carry the float with it, which will gradually open the valve O allowing a portion of the water to escape out the discharge pipe N and as the float falls, the valve will close gradually.

Having thus fully described my invention, what I claim as new and desire to secure by Letters Patent is:—

1. The combination with a pair of tanks connected together by pipes at their top and bottom, of an inlet pipe connected to said pipes, outlet pipes connected to said tanks and a discharge pipe connected to one of said tanks, for the purpose described.

2. The combination with a pair of tanks, of inlet pipes connected to the top and bottom of said tanks, and an outlet pipe connected to the top of said tanks.

3. The combination with a pair of tanks, of inlet pipes connected to the top and bottom of said tanks, outlet pipes connected to the top of said tanks, a discharge pipe secured in the bottom of one of said tanks provided with a valve and a float connected to said valve, for the purpose described.

4. The combination with a pair of tanks, of pipes connecting the top and bottom of said tank, an inlet pipe connected to said pipes, outlet pipes connected to said tanks, and a discharge pipe provided with a valve arranged in one of said tanks, for the purpose described.

5. The combination with a pair of tanks, connected together at their lower ends, of pipes extending down into said tanks provided with distributers, pipes connected to said pipes and the connecting pipes, an inlet pipe connected to said pipes, and outlet pipes connected to said tanks, for the purpose described.

6. In a device of the kind described, the combination with a pair of tanks, of inlet pipes connected to the top and bottom of said tanks, reflectors arranged in said tanks, outlet pipes connected to said tanks, and a valve controlled discharge pipe, connected to one of said tanks, for the purpose described.

7. In a device of the kind described, the combination with a pair of tanks, of inlet pipes connected to said tanks at their top and bottom, distributers connected to the upper inlet pipes, and reflectors arranged under said distributers, for the purpose described.

8. In a device of the kind described, the combination with a pair of tanks, of inlet pipes connected to the top and bottom of said tanks, distributers connected to the upper inlet pipes in said tanks, reflectors arranged in said tanks under said distributers, outlet pipes connected to said tanks, and a discharge pipe connected to one of said tanks provided with a float operated valve, for the purpose described.

9. In a device of the kind described, the combination with a pair of tanks, provided with reduced upper portions, of inlet pipes connected to the bottom of said tanks, inlet pipes connected to said reduced portion having distributers on their ends, outlet pipes connected to the reduced portion, reflectors arranged in said tanks under said distributers, a discharge pipe connected to one of said tanks, provided with a valve, and a float connected to said valve, for the purpose set forth.

10. In a device of the kind described, the combination with a pair of tanks provided with reduced upper portions, of pipes connecting the lower ends of said tanks, pipes extending down into said tank through the tops of the reduced portions, and inlet pipes connected to said pipes and to the pipes connecting the lower end of the tanks, outlet pipes connected to the reduced portion of said tanks, and a valve controlled discharge-pipe connected to one of said tanks, for the purpose described.

11. In a device of the kind described, the combination with a pair of tanks of inlet pipes connected to the top and bottom of said tanks, outlet pipes connected to the top of the said tanks, a discharge pipe extending up into one of said tanks, provided with a valve, and a float slidably mounted in said tank connected to the stem of said valve by links, for the purpose described.

12. In a device of the kind described, the combination with a pair of tanks, of inlet pipes connected to the top and bottom of said tanks, distributers connected to the upper inlet pipes, brackets mounted in said tanks provided with deflectors, apertured lugs secured to one of said brackets, a rod slidably mounted in said lugs carrying a float, a valve controlled discharge pipe connected to said tank and links connecting the stem of said valve to said rod for the purpose described.

13. In a device of the kind described, the combination with a pair of tanks, of inlet pipes connected to the top and bottom of said tanks, distributers connected to the upper inlet pipes, brackets carrying deflectors arranged under said distributers in said tanks, outlet pipes connected to said tanks, a discharge pipe connected to one of said tanks provided with a valve, a float slidably mounted on one of said brackets and links connecting said float to the stem of the valve of the discharge pipe, for the purpose described.

A. T. NEWMAN.

Witnesses:
   Chas. H. Lyon,
   W. C. Lyon.